(12) United States Patent
Nicholson et al.

(10) Patent No.: US 11,126,396 B2
(45) Date of Patent: Sep. 21, 2021

(54) AUDIO OUTPUT DEVICE SELECTION (71) Applicant: Lenovo (Singapore) Pte. Ltd., Singapore (SG)

(72) Inventors: John Weldon Nicholson, Cary, NC (US); Daryl Cromer, Raleigh, NC (US); Howard Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/369,468

(22) Filed: Mar. 29, 2019

(65) Prior Publication Data

US 2020/0310743 A1 Oct. 1, 2020

(51) Int. Cl.
*G06F 3/16* (2006.01)
*G06F 3/0484* (2013.01)

(52) U.S. Cl.
CPC ............ *G06F 3/165* (2013.01); *G06F 3/0484* (2013.01)

(58) Field of Classification Search
None
See application file for complete search history.

(56) References Cited

U.S. PATENT DOCUMENTS

| | | | |
|---|---|---|---|
| 2009/0140986 A1* | 6/2009 | Karkkainen | G06F 3/0486 345/173 |
| 2010/0313143 A1* | 12/2010 | Jung | G06F 3/1446 715/753 |
| 2012/0038541 A1* | 2/2012 | Song | G06F 3/1423 345/1.1 |
| 2012/0131458 A1* | 5/2012 | Hayes | H04W 4/21 715/716 |
| 2013/0194270 A1* | 8/2013 | Walls | G06T 1/20 345/428 |
| 2014/0258880 A1* | 9/2014 | Holm | H04L 65/40 715/748 |
| 2015/0032809 A1* | 1/2015 | Xie | H04L 65/403 709/204 |
| 2017/0061628 A1* | 3/2017 | Shin | H04N 1/00453 |
| 2017/0205980 A1* | 7/2017 | Rainisto | G06F 9/4856 |
| 2018/0374493 A1* | 12/2018 | Usui | G10L 19/173 |

* cited by examiner

*Primary Examiner* — Mandrita Brahmachari
(74) *Attorney, Agent, or Firm* — Ference & Associates LLC (57) ABSTRACT

One embodiment provides a method, including: detecting, at an information handling device, a position of an application window on one of at least two connected display devices operatively coupled to the information handling device; determining, using a processor, an audio output device associated with the one of the at least two connected display devices; and directing audio originating from the application window to the audio output device. Other aspects are described and claimed.

16 Claims, 6 Drawing Sheets

AUDIO OUTPUT DEVICE SELECTION

BACKGROUND

Information handling devices ("devices"), for example laptop and personal computers, smart phones, tablet devices, televisions, other electronic devices, and the like, may comprise one or more integrally or operatively coupled audio output devices. The audio output devices may provide audio for events originating from active applications resident on a display screen of the device. The audio output device corresponding to the display screen may be set by a manufacturer and/or assigned by a user.

BRIEF SUMMARY

In summary, one aspect provides a method, comprising: detecting, at an information handling device, a position of an application window on one of at least two connected display devices operatively coupled to the information handling device; determining, using a processor, an audio output device associated with the one of the at least two connected display devices; and directing audio originating from the application window to the audio output device.

Another aspect provides an information handling device, comprising: at least two connected display devices; an audio output device; a processor; a memory device that stores instructions executable by the processor to: detect a position of an application window on one of the at least two connected display devices operatively coupled to the information handling device; determine an audio output device associated with the one of the at least two connected display devices; and direct audio originating from the application window to the audio output device.

A further aspect provides a product, comprising: a storage device that stores code, the code being executable by a processor and comprising: code that detects a position of an application window on one of at least two connected display devices; code that determines an audio output device associated with the one of the at least two connected display devices; and code that directs audio originating from the application window to the audio output device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional solutions exist for selecting an audio output device correlated with an information handling device. For instance, a manufacturer may designate a default audio output device at the time of production or, alternatively, a user may manually assign a default audio output device within an application or operating system interface (e.g., by interacting with a settings menu, etc.). As an example, in a multi-display setup in which each display comprises an integrated audio output device, a user may desire to have output audio derive from the display comprising the sound producing source (e.g., an application window playing a movie may have sound associated with the movie derive from display device on which the application window was displayed, etc.). As another example, audio streams may be directed to different audio output devices based upon the type of audio stream. For example, a user may elect to have audio associated with a VOIP call be directed to a headset whereas audio associated with all other audio streams (e.g., audio from a media player, a game, another application, etc.) be directed to a separate audio output device (e.g., another device, dedicated speakers, etc.).

Although methods exist for manually selecting an audio output device, accessing and navigating a settings menu may be time-consuming and burdensome, especially for a user who is not particularly computer-savvy. Additionally, due to the manual nature of conventional audio output device selection techniques, at least a portion of an audio stream may play on an unintended audio output device until a user designates a preferred audio output device to play the audio stream. Furthermore, systems that direct audio to audio output devices based on the audio type are not based upon a display that a user may be interacting with, which may result in an awkward soundscape.

Accordingly, an embodiment may dynamically direct audio to a particular audio output device based upon a display device the audio-producing source is resident on. In an embodiment, a multi-display system may exist in which two or more displays are operatively coupled together, each of which comprising an integrated audio output device (e.g., a dual-screen monitor PC setup, etc.). An embodiment may first identify the position of an application window in the multi-display system. In this regard, an embodiment may identify the display device in the multi-display system on which the application window is being displayed. An embodiment may then direct audio generated from the application window to an audio output device associated with the display device displaying the application window (e.g., to an integral audio output source of the display device, etc.). In the case of application window movement to another display device, an embodiment may automatically switch an output designation of the audio from the first audio output device to another audio output device associated with the other display device. Such a method may negate the need for a user to manually navigate through computer preferences and select an audio output device correlated to a relevant display device.

The illustrated example embodiments will be best understood by reference to the figures. The following description is intended only by way of example, and simply illustrates certain example embodiments.

Figure 1:
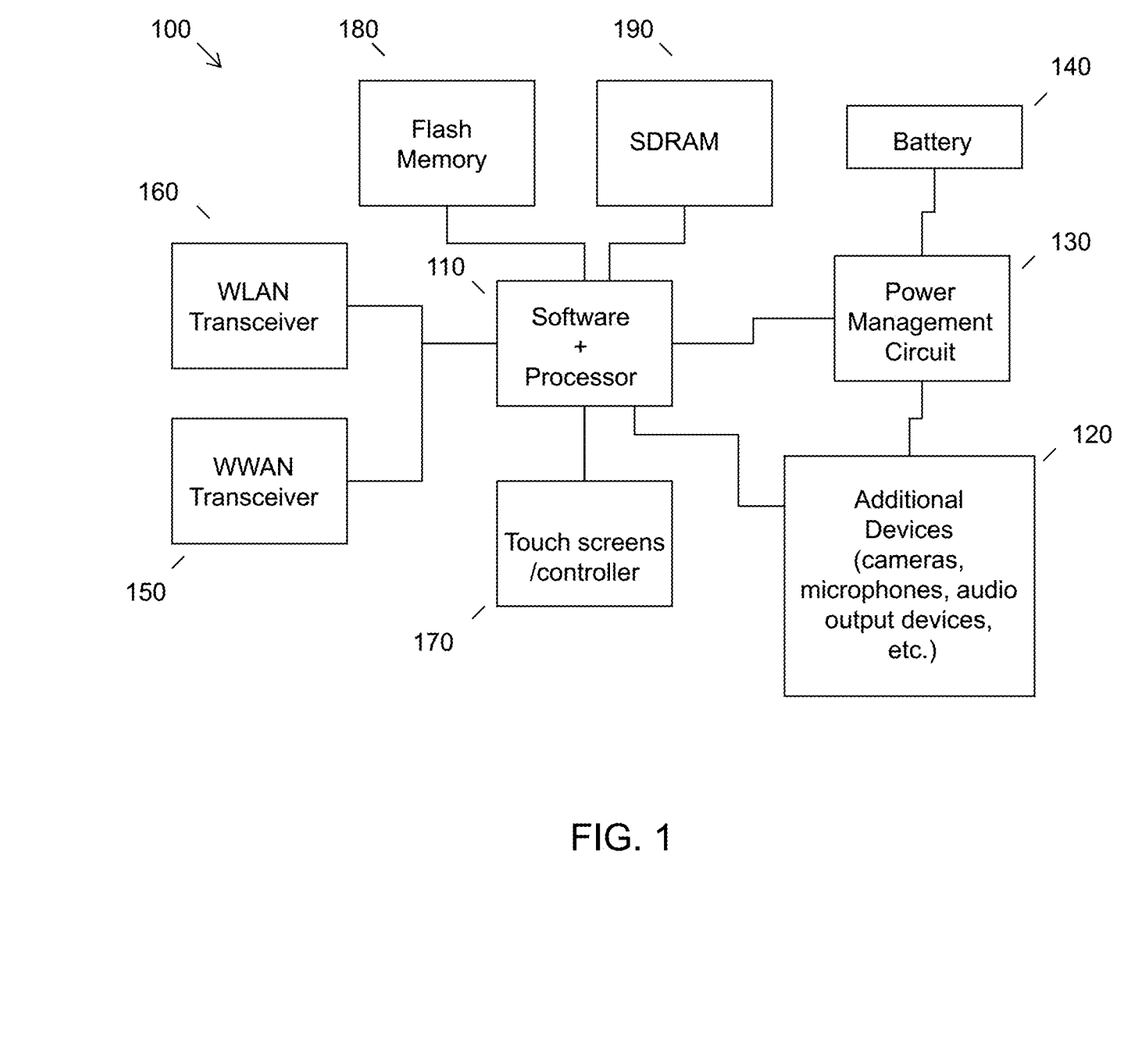
FIG. 1 illustrates an example of information handling device circuitry.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, audio output device such as an integral or operatively coupled speaker, etc. System 100 often includes one or more touch screens 170 for data input and display/rendering. System 100 also typically includes various memory devices, for example flash memory 180 and SDRAM 190.

Figure 2:
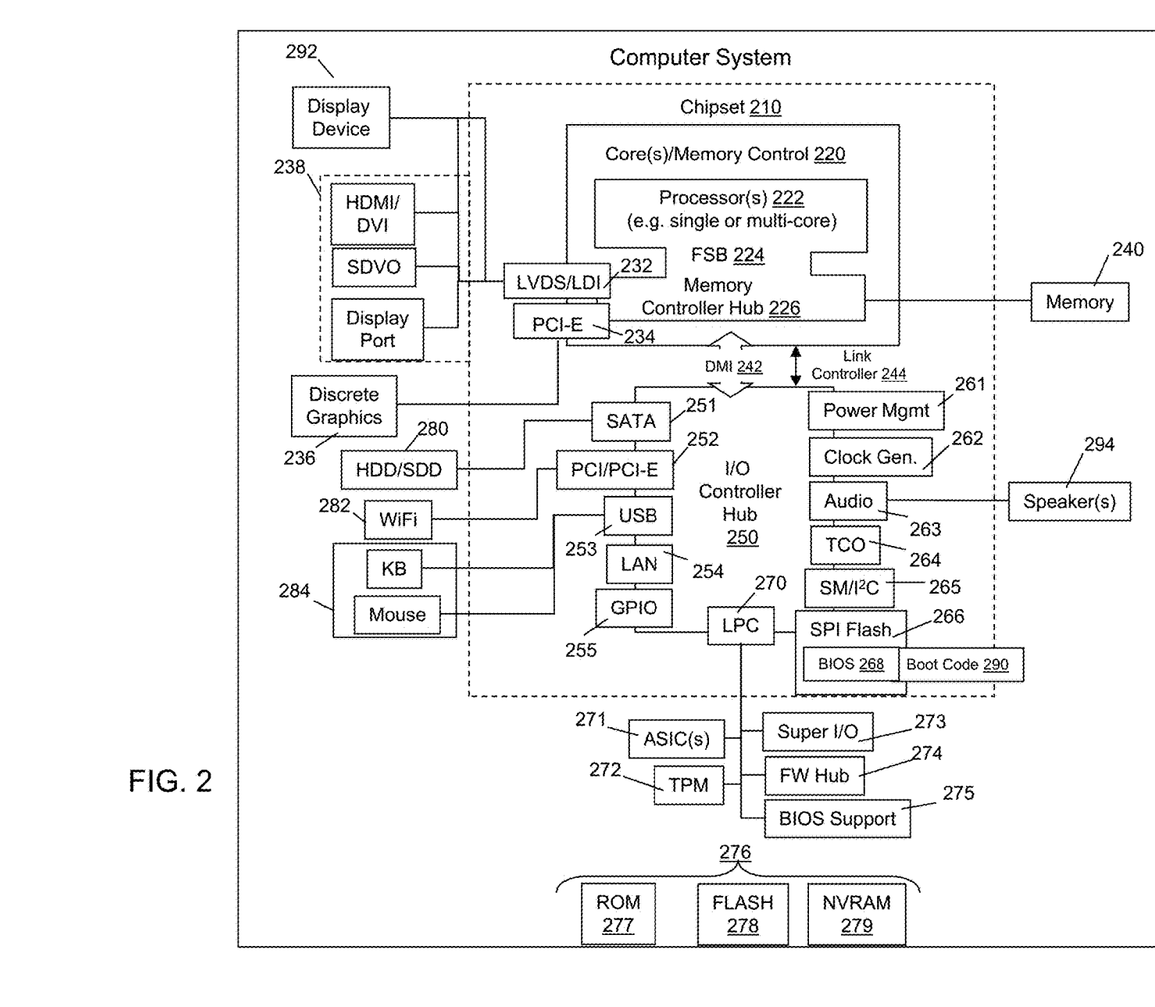
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as laptops, televisions, personal computer devices generally, and/or other electronic devices that may utilize two or more operatively coupled display screens. For example, the circuitry outlined in FIG. 1 may be implemented in a laptop embodiment, whereas the circuitry outlined in FIG. 2 may be implemented in a personal computer system.

Figure 3:
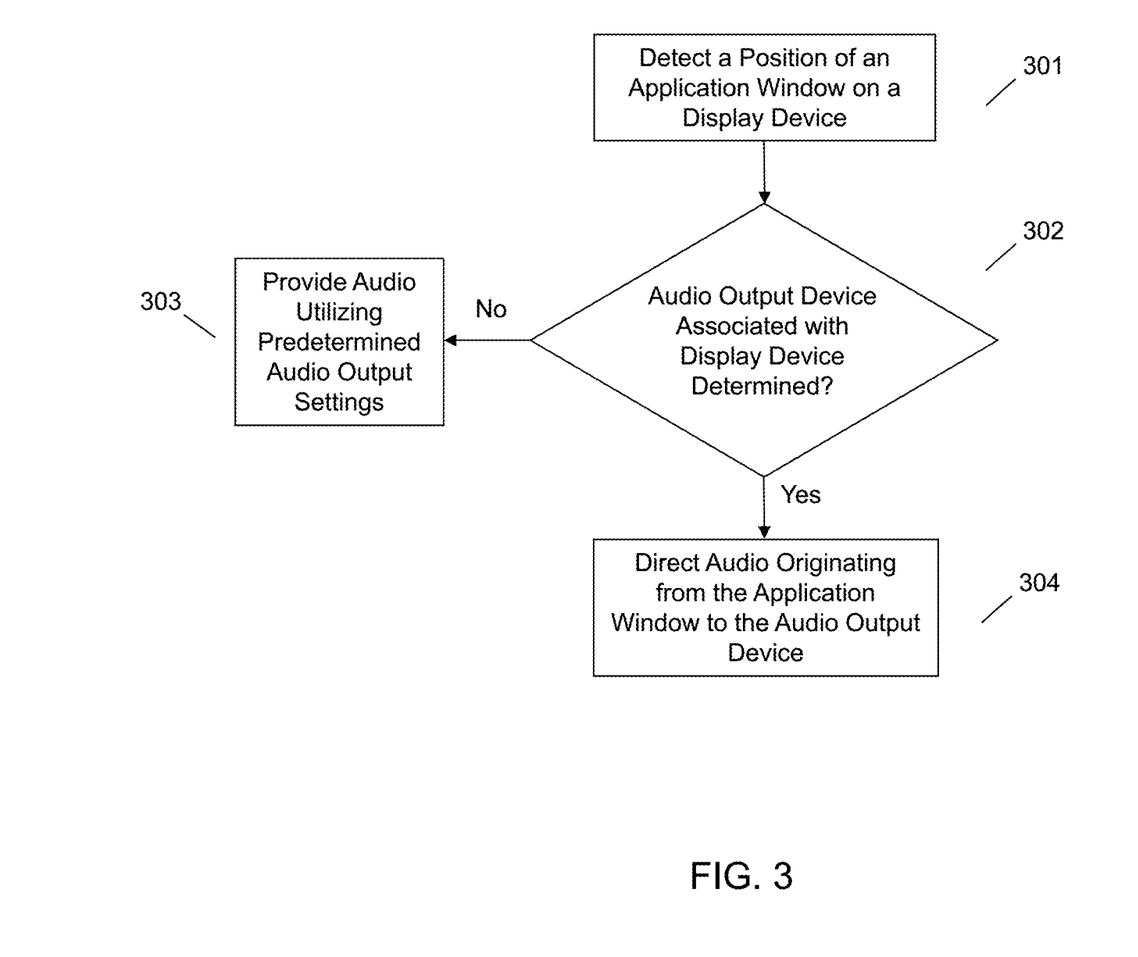
FIG. 3 illustrates an example method of direct audio originating from an application window to an audio output device.
Figure 4:
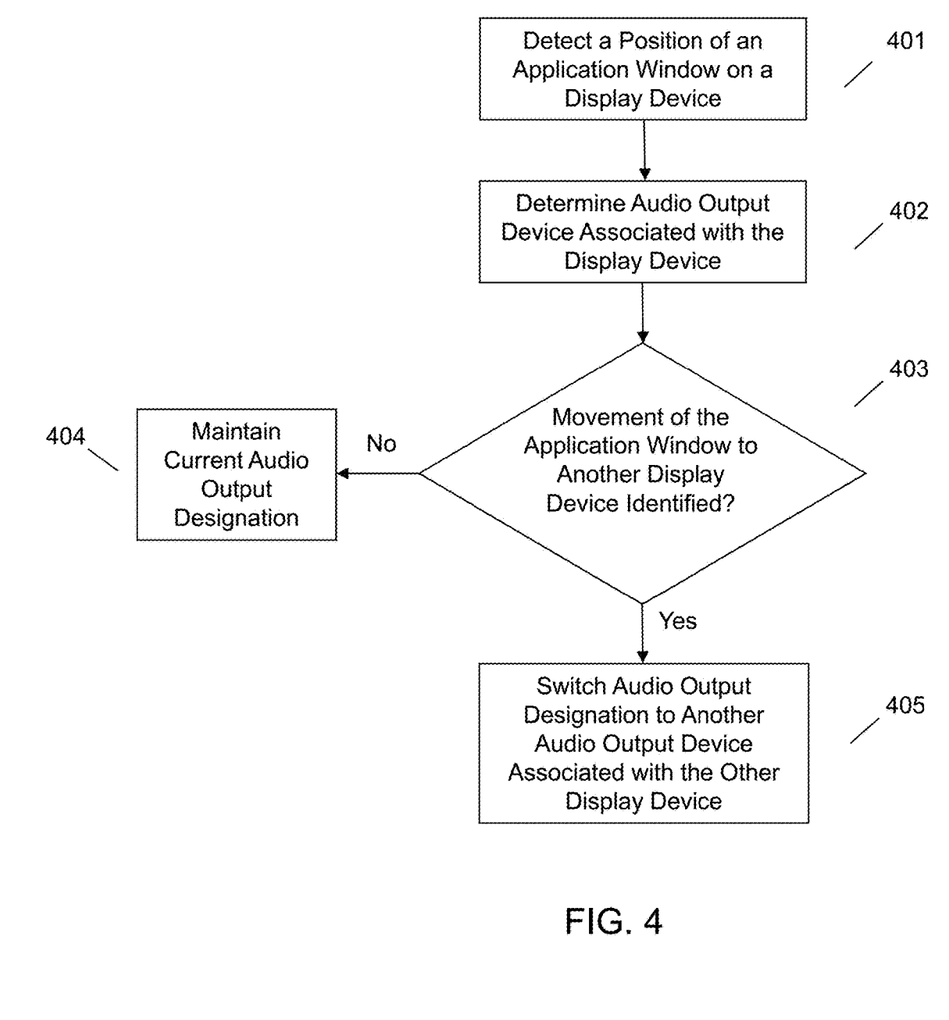
FIG. 4 illustrates an example method of switching an audio output device associated with a display device.

Referring now to FIG. 3, an embodiment may detect the position of an application window on a display device in a system and thereafter output an audio stream from the audio output device associated with the display device displaying the application window. At 301, an embodiment may detect a position of an application window on a display device in a multi-display system. In the context of this application, a multi-display system may correspond to a system in which two or more display devices are utilized to convey information to a user. In an embodiment, the two or more display devices may be integrally or operatively coupled. For example, a multi-display system may correspond to a two or three monitor system, such as illustrated in FIG. 4, in which the monitors are positioned proximate to each other and information may be seamlessly moved from one monitor to the next (e.g., by dragging an application window across monitors using a mouse or stylus, etc.). Alternatively, as another example, a multi-display system may correspond to two or more wirelessly connected devices (e.g., a laptop and a smart TV, etc.) that may not necessarily be positioned proximate to each other but may nevertheless allow for seamless information transfer between devices (e.g., by beaming an application window from the laptop to the smart TV, etc.).

In an embodiment, the detection of the position of an application window on a display device may correspond to detecting a particular display screen, or screens, on which the application window is being displayed upon. For example, an embodiment may conclude that an application window is displayed on a display device if an entirety of the application window is on the display screen of the display device. Stated differently, the foregoing conclusion may be made if the borders of the application window are housed within the borders of the display screen. Alternatively, situations may arise where a portion of an application window may be displayed on one display screen and another portion of the application window may be simultaneously displayed on another display screen. In these situations, an embodiment may conclude that an application window is displayed on a display device if a majority of the application window is displayed on the display screen of the display device. For example, if an application window is simultaneously displayed across two screens, A and B, an embodiment may conclude that the application window is displayed on Screen A responsive to identifying that Screen A comprises a greater percentage of the application window than Screen B.

In an embodiment, a system may utilize coordinate pairs for detection of the position of the application window. More particularly, each display device in the multi-display system may represent a portion of a larger two-dimensional coordinate plane, or virtual grid ("grid"), the entirety of which spans across all of the connected display devices. The grid allows an embodiment to objectively identify the position of displayed contents, in terms of X and Y coordinate pairs, at any position in the grid. In an embodiment, the grid may not be visible to a user and the grid values for each display device may be generated and/or adjusted automatically as display devices are added and/or subtracted from the system.

Figure 5:
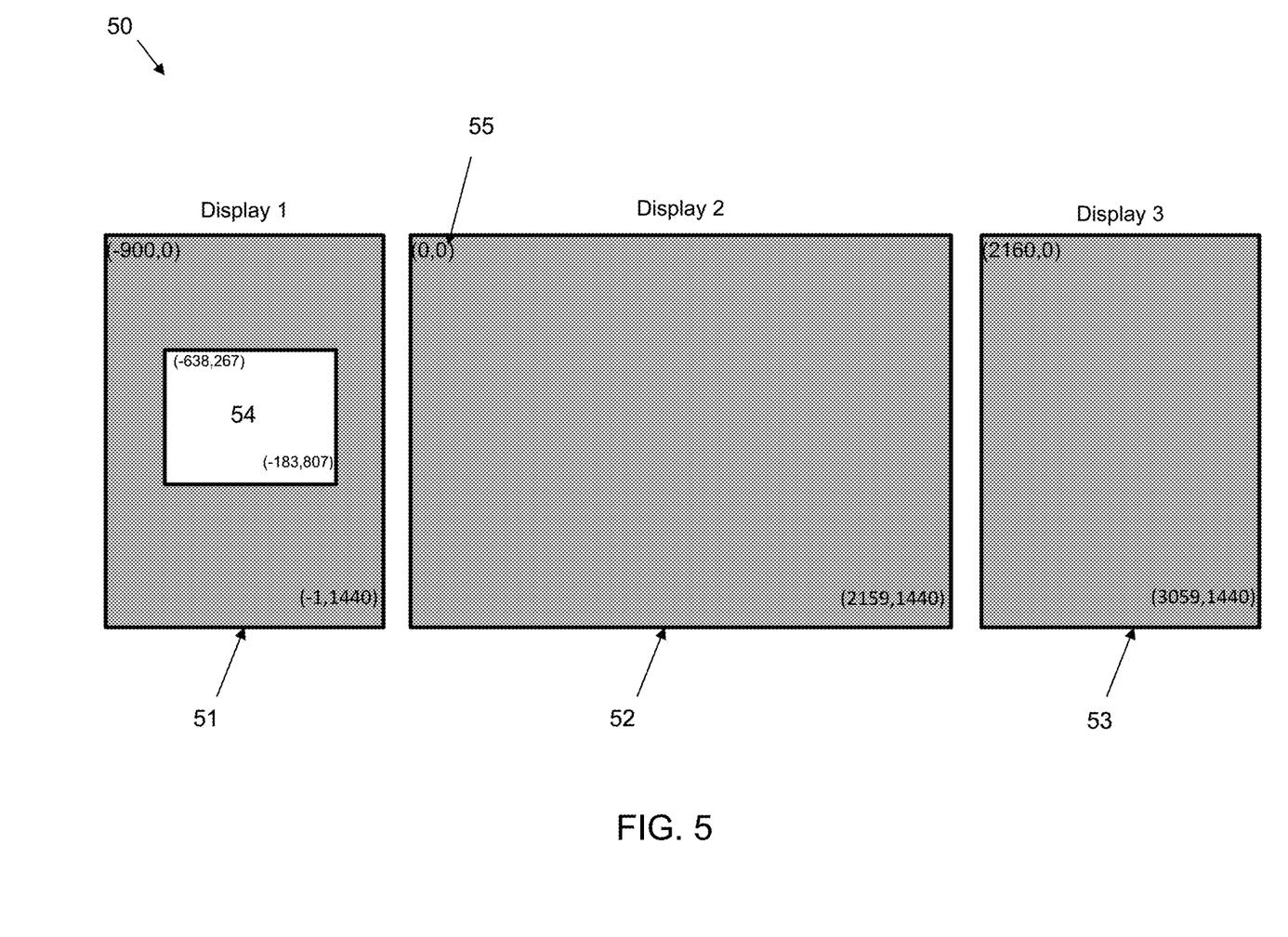
FIG. 5 illustrates an example embodiment of a multi-display device system.

As an example of the foregoing and with reference to FIG. 5, an illustration of a three monitor setup 50 is provided. Solely for description purposes, the boundary defining coordinate pairs for each display device (51, 52, and 53), and an application window 54 displayed on the first display device 51, are presented. As can be seen in the figure, an origin point 55 (i.e., the coordinate pair (0, 0)) may exist at the upper left edge of the second display device 52. This origin point 55 may be an origin for the entirety of the grid spanning across the first 51, the second 52, and the third 53 display devices. Stated differently, only a single origin point may exist across all of the connected display devices from which coordinate pairs for any point in the grid may be generated. Accordingly, the set of coordinate pairs defining the position of the application window 54 may be particular to a single location on the grid. In this way, the specific position for any displayed application window in the system may be accurately identified, regardless of the amount of connected display devices.

At 302, an embodiment may determine an audio output device associated with the display device determined to be displaying the application window. In an embodiment, each display device may have a designated audio output device designation. Stated differently, each display device may have a designated audio output device that may provide audio corresponding to contents displayed on each display. In an embodiment, the audio output device designation may be set by a manufacturer and/or adjusted by a user. Knowledge of the audio output designation may be stored at an accessible database (e.g., stored locally on the device or remotely on another device or server, etc.).

In an embodiment, a display device's designated audio output device may be the audio output device that is physically integrated into the display device. Alternatively, a display device's designated audio output device may be another, remote audio output device. In some instances, multiple audio output devices may be tasked with simultaneously providing audio output for an application window when the application window is identified as being positioned on a particular display device. For example, in a three monitor setup where each monitor comprises an integrated audio output device, such as illustrated in FIG. 5, an embodiment may direct the audio to both audio output devices integral to the first and third display device when an application window is identified as being positioned on the second display device.

Responsive to not detecting, at 302, an audio output device associated with the display device determined to be displaying the application window, an embodiment may, at 303, direct audio to audio output devices by referring to predetermined settings. Conversely, responsive to determining, at 302, an audio output device associated with the display device determined to be displaying the application window, an embodiment may, at 304, direct audio originating from the application window to the designated audio output device. In an embodiment, the directing of the audio may be based on one or more user-defined settings. As an example and with reference to FIG. 5, if the application window 54 was launched and was automatically opened on the first display device 51, an embodiment may direct audio originating from the application window 54 to the audio output device associated with the first display device 51. Alternatively, if the application window 54 was launched and was automatically opened on the third display device 53, an embodiment may direct audio originating from the application window 54 to the audio output device associated with the second display device 52. Alternatively, if the application window 54 was launched and was automatically opened on the second display device 52, an embodiment may direct audio originating from the application window 54 to two or more audio output devices (e.g., an audio output device associated with the first display device 51 and the third display device 53, etc.).

Referring now to FIG. 4, a method for dynamically switching an audio output device to another audio output device is described. As steps 401-402 are substantially similar to steps 301-302 of the foregoing disclosure, these steps are not repeated here but can be found above with reference to the disclosure associated with steps 301-302.

At 403, an embodiment may identify whether the application window has been moved to another display device. An application window may be moved between display devices by, for example, manually dragging the application window from one display device to another (e.g., using a mouse, a stylus, etc.). In an embodiment, the identification that the application window has been moved to another display device may comprise identifying that the coordinate pairs of the application window (e.g., the edge coordinate pairs, etc.) now correspond to coordinate pairs housed within the display screen of another display device. Additionally or alternatively, the identification that the application window has been moved to another display device may comprise identifying that another display device now comprises a majority percentage of the application window.

As an example of the foregoing and with reference to FIG. 5, the application window 54 may be originally displayed on the first display device 51 at edge coordinates (−638, 267) to (−183, 807). An embodiment may be able to identify that the application window 54 has moved to another display device if an embodiment detects that the coordinates for the application window 54 have been adjusted to, for example, (1300, 267) to (1755, 807), which would place the entirety of application window 54 onto a portion of the grid associated with the second display device 52. Alternatively, in another example, an embodiment may identify that the application window 54 has not moved to another display device if an embodiment detects that the coordinates for the application window 54 have been adjusted to, for example, (−638, 567) to (−183, 1107), which would place the application window 54 onto another portion of the grid associated with the first display device 52.

Figure 6:
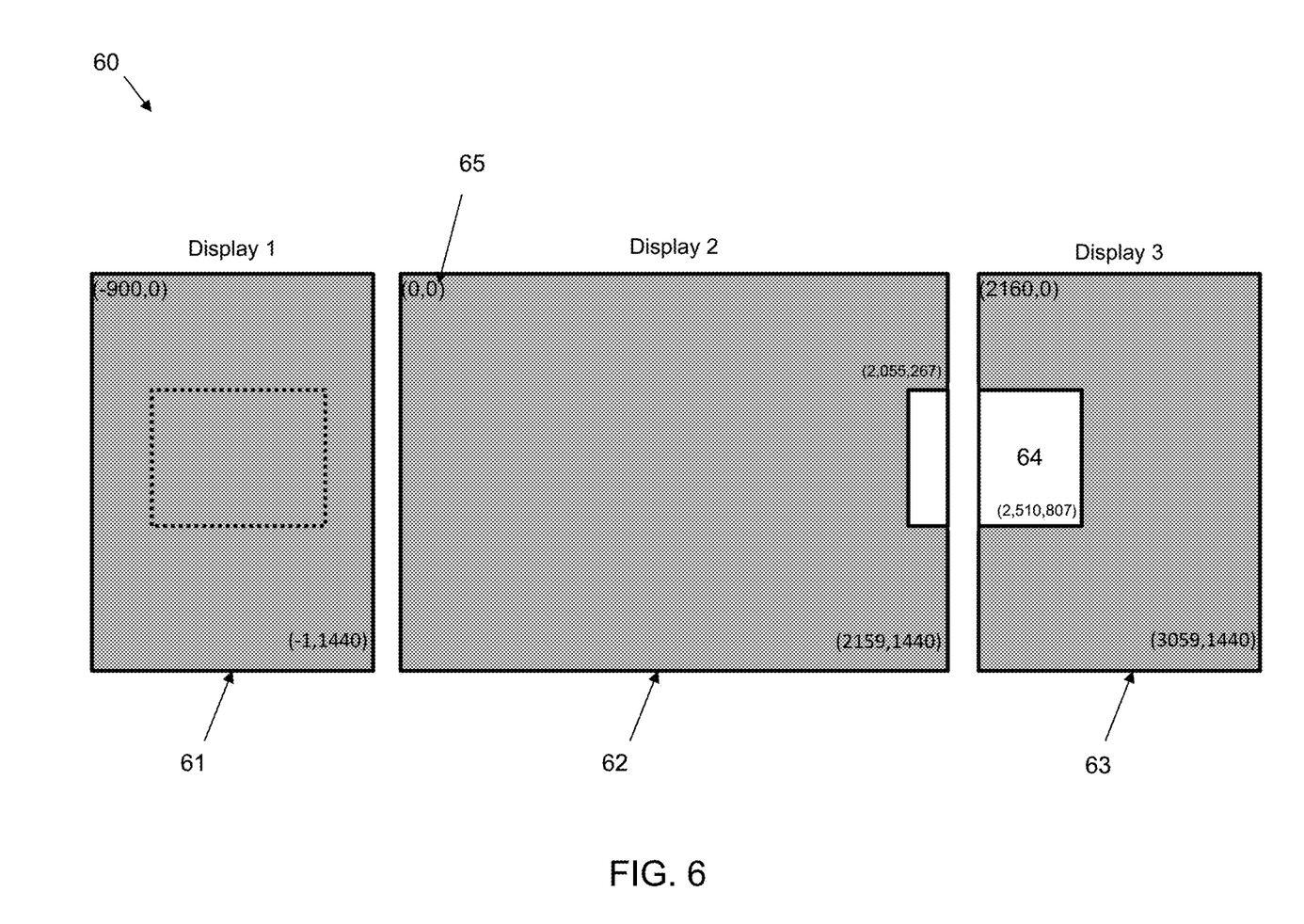
FIG. 6 illustrates an example embodiment of a multi-display device system.

In yet another example, referring now to FIG. 6, an embodiment may identify that the application window 64 has been moved to another display device from its origin point (i.e., display device 61 where the original application window position is reflected by dashed lines) if an embodiment detects that the majority of the application window 64 is associated with a particular display screen. For instance, if the coordinates for the application window 64 have been adjusted to, for example, (2,055, 267) to (2,510, 807), the application window 54 may now be partially displayed across two display devices (i.e., the second display device 62 and the third display device 63). However, because the majority of the application window 64 is displayed on the third display device 63, an embodiment may conclude that the application window 64 has been moved to the third display device 63. Additionally or alternatively, an embodiment may identify that the application window 64 has been moved to the third display device 63 by identifying that third display device 63 comprises a greater percentage of the application window 64 than the second display device 62 (i.e., the second display device 62 comprises approximately 23% of the application window whereas the third display device 63 comprises approximately 77% of the application window 64).

Responsive to identifying, at 403, that the application window has not been moved to another display device, an embodiment may, at 404, maintain the current audio output designation. Conversely, responsive to identifying, at 403, that the application window has moved to another display device, an embodiment may, at 405, switch an output designation of the audio from the audio output device associated with the first display device to another audio output device associated with the second display device. For example, the audio output device associated with the second display device may be an audio output device integrated into the second display device, may be a remote audio output device operatively coupled to the second display, may be a plurality of audio output devices (e.g., audio may be directed to audio output devices integrally or operatively coupled to at least two monitors in a dual or multi-monitor setup, etc.).

In an embodiment, the switching of the audio stream may occur automatically and without any manual user input. In an embodiment, if audio associated with an application window was already being output by an audio output device when the application window was moved to another display device, an embodiment may dynamically and seamlessly switch output of the audio to another audio output device associated with the other display device without pausing or interrupting the audio flow. In an embodiment, if a position of an application window cannot be determined, an embodiment may refer back to predetermined user settings that identify preferred audio output devices for different applications or application types (e.g., media playing applications, audio communications applications, etc.).

The various embodiments described herein thus represent a technical improvement to conventional audio output provision techniques. Using the techniques described herein, an embodiment may detect the position of an application window and identify a display device in a multi-display system that corresponds to the position. An embodiment may then direct audio to an integral or operatively coupled audio output device that is associated with the display device displaying the application window. If the application window is moved to another display device, an embodiment may then dynamically adjust an output designation of the audio from the audio output device associated with the first display device to another audio output device associated with the destination display device. Such a method may allow audio to be provided to a user in a more contextually relevant way. Additionally, such a method may eliminate the current requirement for manual adjustment and designation of audio output settings each time an application window is moved between display screens.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at an information handling device, a position of an application window on one of at least two connected display devices operatively coupled to the information handling device, wherein the detecting the position of the application window comprises:
   identifying coordinate pairs associated with the application window on a coordinate plane, wherein the coordinate plane spans across the at least two connected display devices; and
   identifying the one of the at least two connected display devices comprising the coordinate pairs;
   determining, using a processor, an audio output device associated with each of the one of the at least two connected display devices; and
   directing audio originating from the application window to the audio output device associated with the one of the at least two connected display devices displaying the application window.

2. The method of claim 1, wherein the coordinate plane spans across all of the at least two connected display devices.

3. The method of claim 1, further comprising:
   identifying, using a processor, movement of the application window from the one of the at least two connected display devices to another of the at least two connected display devices; and
   switching, based on the movement, an output designation of the audio from the audio output device to another audio output device associated with the another of the at least two connected display devices.

4. The method of claim 3, wherein the output designation is based on the position of the application window.

5. The method of claim 3, wherein the identifying comprises identifying which of the at least two connected display devices comprises a majority percentage of the application window.

6. The method of claim 3, wherein the audio output device is outputting the audio and wherein the switching comprises outputting the audio on the another audio output device substantially without interruption.

7. The method of claim 1, wherein the determining comprises determining the audio output device based on a user-defined association.

8. The method of claim 7, wherein the user-defined association is stored in an accessible storage database.

9. An information handling device, comprising:
   at least two connected display devices;
   an audio output device;
   a processor;
   a memory device that stores instructions executable by the processor to:
   detect a position of an application window on one of the at least two connected display devices operatively coupled to the information handling device, wherein to detect the position of the application window comprises:
   identifying coordinate pairs associated with the application window on a coordinate plane, wherein the coordinate plane spans across the at least two connected display devices; and
   identifying the one of the at least two connected display devices comprising the coordinate pairs;
   determine an audio output device associated with each of the one of the at least two connected display devices; and
   direct audio originating from the application window to the audio output device associated with the one of the at least two connected display devices displaying the application window.

10. The information handling device of claim 9, wherein the coordinate plane spans across all of the at least two connected display devices.

11. The information handling device of claim 9, wherein the instructions are further executable by the processor to:

identify movement of the application window from the one of the at least two connected display devices to another of the at least two connected display devices; and switch, based on the movement, an output designation of the audio from the audio output device to another audio output device associated with the another of the at least two connected display devices.

12. The information handling device of claim 11, wherein the output designation is based on the position of the application window.

13. The information handling device of claim 11, wherein the instructions executable by the processor to identify comprise instructions executable by the processor to identify which of the at least two connected display devices comprises a majority percentage of the application window.

14. The information handling device of claim 11, wherein the audio output device is outputting the audio and wherein the instructions executable by the processor to switch comprise instructions executable by the processor to output the audio on the another audio output device substantially without interruption.

15. The information handling device of claim 9, wherein the instructions executable by the processor to determine comprise instructions executable by the processor to determine based on a user-defined association.

16. A product, comprising:
a processor and a storage device that stores code, the code being executable by the processor and comprising:
code that detects a position of an application window on one of at least two connected display devices, wherein the code that detects the position of the application window comprises:
code that identifies coordinate pairs associated with the application window on a coordinate plane, wherein the coordinate plane spans across the at least two connected display devices; and
code that identifies the one of the at least two connected display devices comprising the coordinate pairs;
code that determines an audio output device associated with each of the one of the at least two connected display devices; and
code that directs audio originating from the application window to the audio output device associated with the one of the at least two connected display devices displaying the application window.

* * * * *